US011904440B2

(12) United States Patent
Miyazaki

(10) Patent No.: US 11,904,440 B2
(45) Date of Patent: Feb. 20, 2024

(54) ELECTRIC POWER TOOL

(71) Applicant: PANASONIC INTELLECTUAL PROPERTY MANAGEMENT CO., LTD., Osaka (JP)

(72) Inventor: Hiroshi Miyazaki, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 16/554,216

(22) Filed: Aug. 28, 2019

(65) Prior Publication Data

US 2020/0070325 A1 Mar. 5, 2020

(30) Foreign Application Priority Data

Aug. 30, 2018 (JP) ................................ 2018-162123

(51) Int. Cl.
*B25B 23/147* (2006.01)
*B25B 21/00* (2006.01)
*B25F 5/00* (2006.01)

(52) U.S. Cl.
CPC ............ *B25B 23/147* (2013.01); *B25B 21/00* (2013.01); *B25F 5/001* (2013.01)

(58) Field of Classification Search
CPC ....... B25B 21/00; B25B 21/02; B25B 21/147; B25B 21/1475; B23P 19/06; B23P 19/066; B25F 5/001
USPC .................................................... 81/464, 469
See application file for complete search history.

(56) References Cited

U.S. PATENT DOCUMENTS

2003/0090227 A1* 5/2003 Ito ...................... B25B 23/1405 318/434
2013/0327552 A1 12/2013 Lovelass et al.
2014/0374130 A1* 12/2014 Nakamura ............ B25D 11/00 173/176
2015/0042247 A1 2/2015 Kusakawa
2016/0250738 A1* 9/2016 Leh ........................ B25B 21/02 173/176

(Continued)

FOREIGN PATENT DOCUMENTS

EP 2 724 821 A1 4/2014
EP 3 115 154 A1 1/2017

(Continued)

OTHER PUBLICATIONS

Extended European Search Report dated Feb. 4, 2020 issued for the corresponding European Patent Application No. 19191462.1.

(Continued)

*Primary Examiner* — Tom Rodgers
(74) *Attorney, Agent, or Firm* — Rimon P.C.

(57) ABSTRACT

An electric power tool includes a body, a driver, a manipulation section, a load sensor, and a controller. To the body, a tool is attachable. The driver is configured to drive the tool to rotate, the tool being attached to the body. The manipulation section is configured to receive an operation for causing operation of the driver. The load sensor is configured to measure a load caused when the driver operates. The controller is configured to: set an upper limit value of a rotation speed of the driver in accordance with the load measured by the load sensor; and control driving of the driver to rotate based on the upper limit value.

2 Claims, 4 Drawing Sheets

(56) References Cited

U.S. PATENT DOCUMENTS

| | | | |
|---|---|---|---|
| 2018/0099391 | A1 | 4/2018 | Umemoto et al. |
| 2018/0318999 | A1 | 11/2018 | Lovelass et al. |

FOREIGN PATENT DOCUMENTS

| | | | |
|---|---|---|---|
| JP | 2002-283248 | A | 10/2002 |
| JP | 2013-255987 | A | 12/2013 |
| JP | 2014-050923 | A | 3/2014 |
| JP | 2016-087716 | A | 5/2016 |
| JP | 2017-185568 | A | 10/2017 |

OTHER PUBLICATIONS

Notice of Reasons for Refusal dated Jan. 5, 2022, in corresponding Japanese Patent Application No. 2018-162123, with English translation.

* cited by examiner

ELECTRIC POWER TOOL

CROSS-REFERENCE TO RELATED APPLICATION

The present application is based upon and claims the benefit of priority of Japanese Patent Application No. 2018-162123, filed on Aug. 30, 2018, the entire contents of which are incorporated herein by reference.

TECHNICAL FIELD

The present disclosure generally relates to electric power tools and specifically to an electric power tool including a body to which a tool is attachable.

BACKGROUND ART

JP 2002-283248 A describes a tightening tool including: a motor control means configured to control rotation and suspension of a motor; and a torque estimation means configured to estimate a tightening torque of an output shaft of the motor. The tightening tool uses rotational force of the motor to tighten screws, bolts, and the like. In the tightening tool, the torque estimation means obtains a torque variation, and when, after the torque variation exceeds a determination start reference value which is arbitrarily determined, the torque variation becomes lower than or equal to about 0, it is determined that tightening of screws and the like is completed, and a suspension command is output to the motor control means.

In the tightening tool, rotation of the motor can be suspended when tightening of screws and the like is completed, but the rotation speed of the motor is not controlled in accordance of the degree of the tightening (tightening amount) of screws and the like. Thus, in the tightening tool, the rotation speed of the motor may become too high (fast), which results in that tightening of screws and the like becomes difficult.

SUMMARY

In view of the foregoing, it is an object of the present disclosure to provide an electric power tool with which tightening of screws and the like is easily performed.

An electric power tool according to an aspect of the present disclosure includes: a body to which a tool is attachable; a driver; a manipulation section; a load sensor; and a controller. The driver is configured to drive the tool to rotate, the tool being attached to the body. The manipulation section is configured to receive an operation for causing rotation of the driver. The load sensor is configured to measure a load caused when the driver operates. The controller is configured to: set an upper limit value of a rotation speed of the driver in accordance with the load measured by the load sensor; and control rotation of the driver based on the upper limit value.

DETAILED DESCRIPTION

An embodiment of the present disclosure will be described below with reference to the drawings. Note that the embodiment described below is a mere example of various embodiments of the present disclosure. Various modifications may be made to the following embodiment depending on design and the like as long as the object of the present disclosure is achieved. Moreover, FIG. 2 described in the following embodiment is a schematic view. The sizes and the dimensional ratio of components in FIG. 2 do not necessarily represent actual ones.

In the following description, upward, downward, forward, and rearward directions of an electric power tool are defined as shown by arrows in FIG. 2. These arrows are shown simply to supplement explanation and are not accompanied by entity. Note that these directions should not be construed as limiting the directions in which the electric power tool is used.

First Embodiment (1) Configuration

Figure 1:
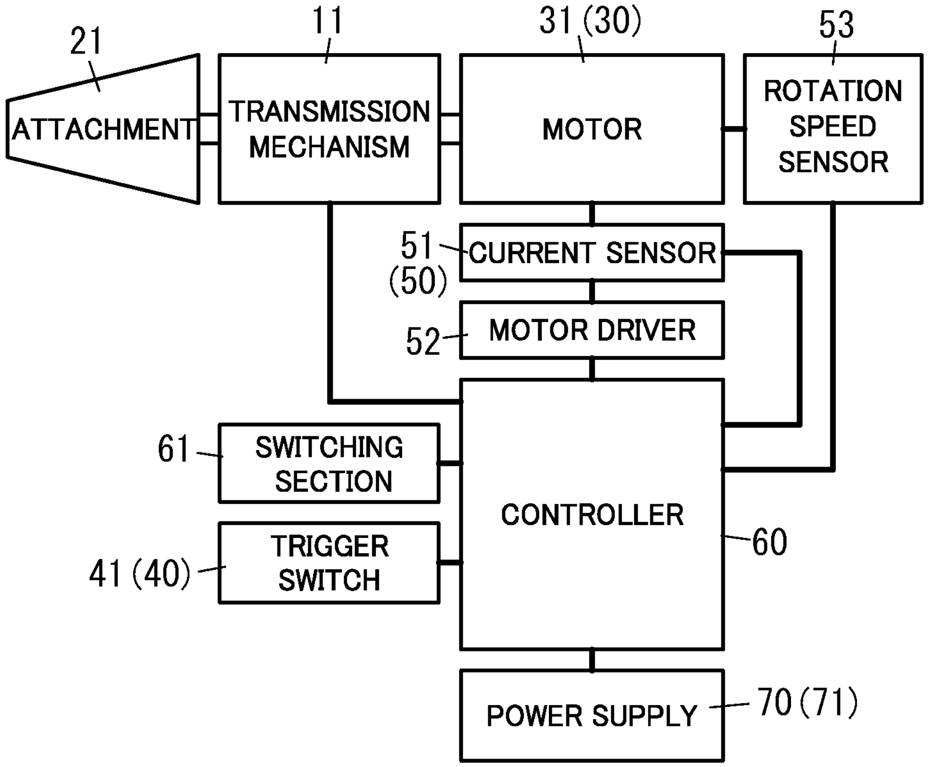
FIG. 1 is a block diagram illustrating a schematic configuration of an electric power tool according to an embodiment.
Figure 2:
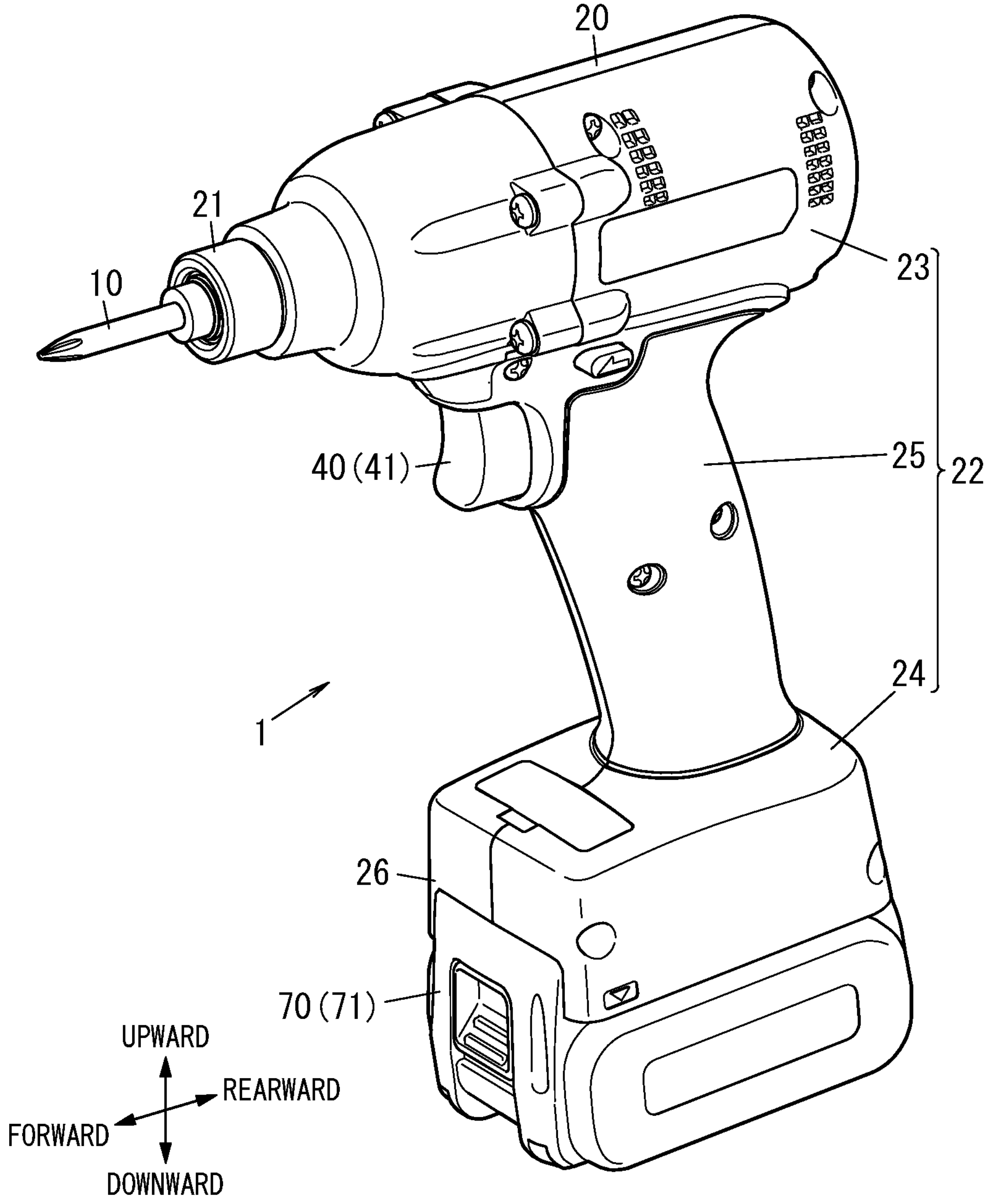
FIG. 2 is a perspective view illustrating the schematic configuration of the electric power tool.
Figure 3:
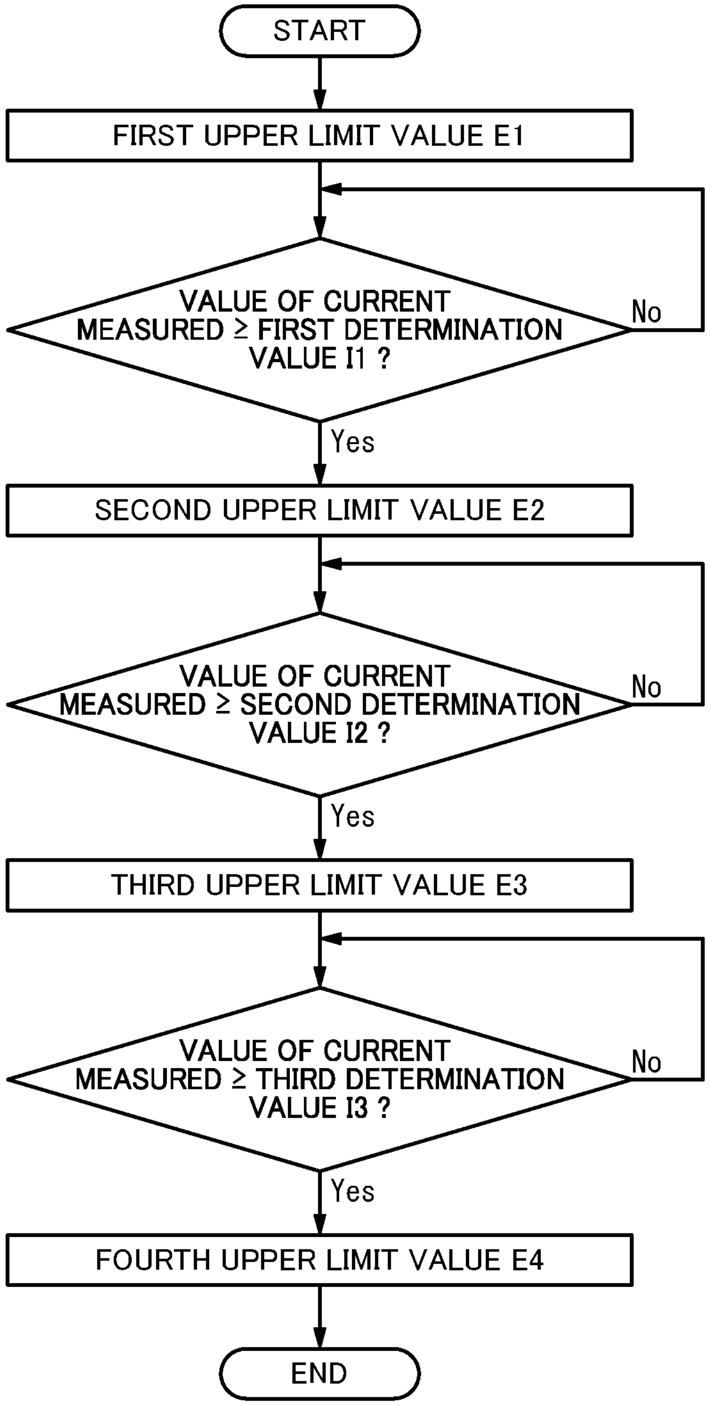
FIG. 3 is a flowchart illustrating operation of the electric power tool.

An electric power tool 1 according to the present embodiment is handheld or portable, and as illustrated in FIGS. 1 and 2, the electric power tool 1 includes a body 20, a driver 30, a manipulation section 40, a load sensor 50, and a controller 60.

The body 20 includes an attachment 21 to which a tool 10 is attachable. The tool 10 is, for example, a driver bit for tightening and/or screwing screws. The tool 10 is detachably attached to the attachment 21. The body 20 includes a housing 22. The housing 22 includes a first body section 23, a second body section 24, and a grip 25. The first body section 23 accommodates a motor 31 serving as the driver 30 and a transmission mechanism 11. The second body section 24 includes a battery pack attachment 26 to which a battery pack 71 serving as a power supply 70 is attachable. The grip 25 connects the first body section 23 to the second body section 24.

The driver 30 has a function of driving the tool 10 to rotate, the tool 10 being attached to the body 20. That is, the driver 30 has a function of driving the attachment 21 to rotate so as to drive the tool 10 to rotate along with the attachment 21. The driver 30 serves as the motor 31. The motor 31 has a rotary shaft mechanically connected to the transmission mechanism 11. The attachment 21 is mechanically connected to the transmission mechanism 11. The motor 31 rotates the rotary shaft when supplied with electric power.

The manipulation section 40 has a function of receiving an operation given by a user to cause operation of the driver 30. That is, the manipulation section 40 has a function of being manipulated to allow electric power to be supplied to the driver 30 to cause operation of the driver 30 so as to drive the tool 10 to rotate. The manipulation section 40 is disposed at a location higher than the center in the longitudinal direction of the grip 25. The manipulation section 40 is exposed from a front surface of the grip 25. Disposing the manipulation section 40 at the grip 25 allows a worker to easily manipulate the manipulation section 40 when the worker holds the grip 25 with his/her hand to use the electric power tool 1. Examples of the manipulation section 40 include a push button switch such as a trigger switch 41. The trigger switch 41 is electrically connected to the controller 60 configured to control the motor 31. The trigger switch 41 is a multistage switch or continuously variable switch (variable resistor) whose manipulation signal varies in accordance with a manipulation amount (pressing amount).

The load sensor 50 has a function of sensing a load caused when the driver 30 operates. That is, the load sensor 50 has a function of sensing a load applied to the driver 30 while the driver 30 is supplied with electric power to operate the rotary shaft. In the present embodiment, the load sensor 50 is a current sensor 51. The current sensor 51 is an electric circuit and is configured to measure, as the load, a current flowing through the motor 31. The current sensor 51 is electrically connected to the motor 31. The current sensor 51 is also electrically connected to the controller 60, and in this case, the current sensor 51 is connected in two systems. In a first system, the current sensor 51 is electrically connected via a motor driver 52 to the controller 60. The motor driver 52 is a portion (electric circuit) configured to drive the motor 31 and change the torque of the motor 31 to adjust the rotation speed of the rotary shaft. In a second system, the current sensor 51 is electrically connected to the controller 60 without using the motor driver 52.

The controller 60 has a function of: setting an upper limit value of the rotation speed of the driver 30 in accordance with the load measured by the load sensor 50; and controlling rotation of the driver 30 based on the upper limit value. The controller 60 includes, for example, a microcomputer including a central processing unit (CPU) and memory, and the CPU executes a program stored in the memory to control operation of the motor 31. That is, the controller 60 has a function as a motor controller configured to control the motor 31 via the motor driver 52. The controller 60 may have a function as, for example, a transmission controller configured to control the transmission mechanism (transmission apparatus) 11 to switch reduction gear ratios. A rotation speed sensor 53 has a function of measuring the rotation speed of the rotary shaft of the motor 31. The rotation speed sensor 53 is an electric circuit electrically connected to the motor 31 and the controller 60.

The power supply 70 supplies electric power to the controller 60, the motor driver 52, and the motor 31. The power supply 70 is, for example, the battery pack 71. The battery pack 71 includes a chargeable secondary battery. Only one type of battery pack 71 may be insertable into the battery pack attachment 26, or a plurality of types of battery packs may be attachable to the battery pack attachment 26. For example, a plurality of types of battery packs having different rated voltages and battery capacities may be attachable.

(2) Operation

Next, with reference to FIG. 3 and FIGS. 4A to 4D, a case where the electric power tool 1 of the present embodiment is used to screw a screw (wood screw) is described.

Figure 4A:
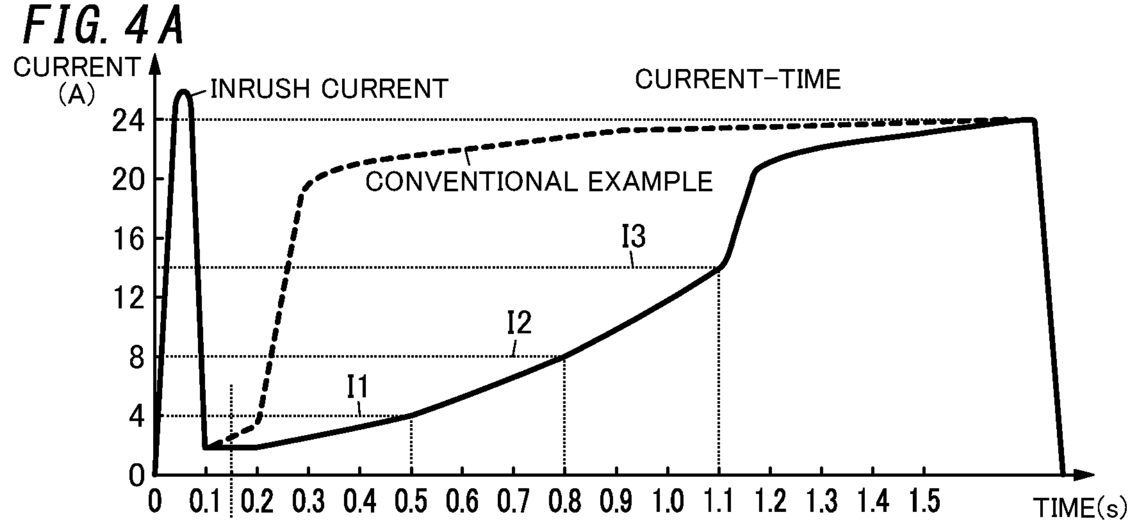
FIG. 4A is a view illustrating a current value-time relationship of a motor in the electric power tool.
Figure 4B:
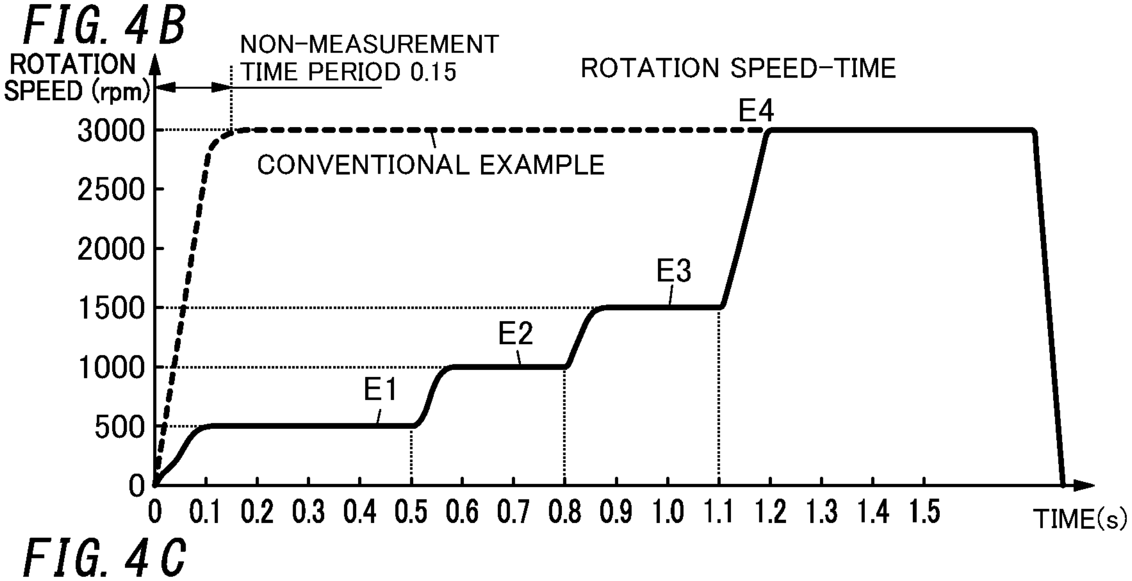
FIG. 4B is a view illustrating a rotation speed-time relationship of a driver tip in the electric power tool.
Figure 4C:
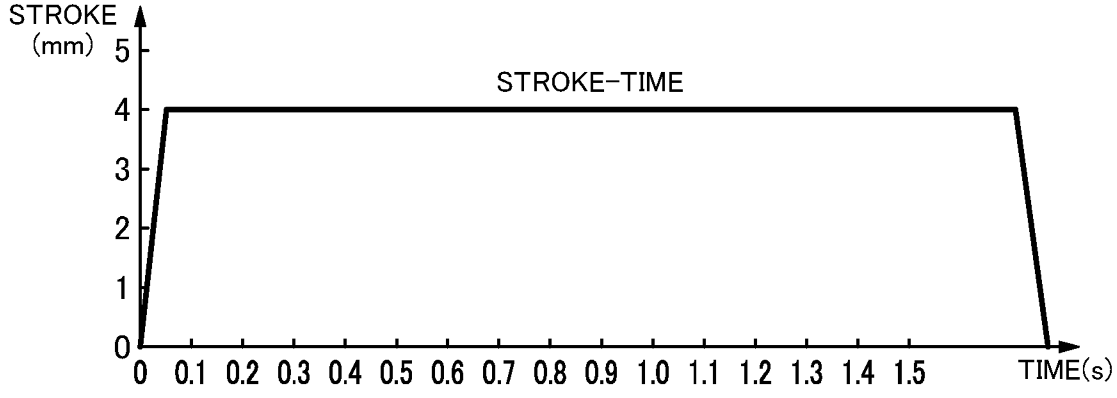
FIG. 4C is a view illustrating a stroke-time relationship of a trigger switch in the electric power tool.
Figure 4D:
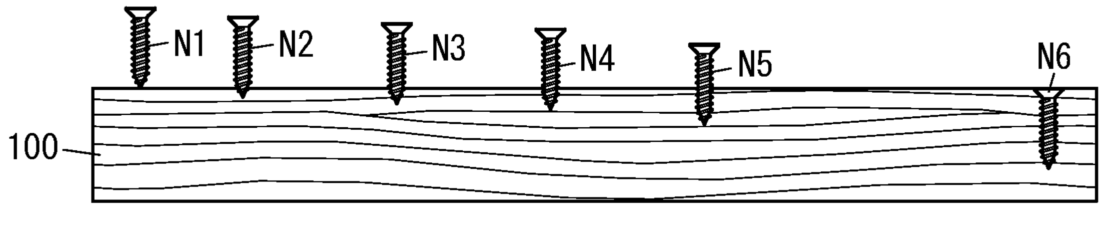
FIG. 4D is a view illustrating a tightening state of a screw when the electric power tool is used.

First, as represented by a screw N1 in FIG. 4D, a tip of the screw N1 is brought into contact with a surface of a member 100 such that the screw N1 is upright. Then, a tip of the tool 10 attached to the electric power tool 1 is inserted into a hole (tightening driver) in the head of the screw N1.

Next, the trigger switch 41 is pressed to supply electric power from the power supply 70 to the controller 60. Here, the trigger switch 41 is pressed such that a drawing amount (stroke) is maximum (see FIG. 4C). Moreover, an inrush current flows from form the power supply 70 through the controller 60. The inrush current flows from the controller 60 via the motor driver 52 and the current sensor 51 to the motor 31, and the motor 31 starts operating to drive the rotary shaft of the motor 31 to rotate. Then, rotation of the rotary shaft is transmitted via the transmission mechanism 11 to the attachment 21, thereby driving the attachment 21 to rotate, as a result of which, the tool 10 is started to be driven to rotate. During a period from manipulation of the trigger switch 41 to an end of flow of the inrush current, the current sensor 51 does not measure a current flowing through the motor 31. The screw N1 is slightly rotated, and as represented by a screw N2, a state where a tip of the screw N2 slightly enters the member 100 (see FIG. 4D) is achieved.

Next, after a prescribed time has elapsed since the trigger switch 41 was drawn, the current sensor 51 starts measuring a current input to the motor 31. In this embodiment, "after a prescribed time has elapsed" means, for example, a time point at which flow of the inrush current ends, that is, "a prescribed time" is a time period (non-measurement time period) during which the current sensor 51 does not note measure the current. The time period (non-measurement time period) is obtained by an experiment or the like in advance in is set in the controller 60. In the present embodiment, the non-measurement time period is 0.15 s. Moreover, the controller 60 sets a first upper limit value E1 (see FIG. 4B) in the motor driver 52. The first upper limit value E1 is an initial limit and is an upper limit value of the rotation speed of the rotary shaft at an early stage of operation of the motor 31. In the present embodiment, the first upper limit value E1 is 500 rpm. Then, the rotary shaft of the motor 31 starts rotating at a rotation speed corresponding to the first upper limit value E1. The current sensor 51 measures a current after the inrush current ends as described above, and therefore, it is possible to easily eliminate the influence of the inrush current flowing immediately after the trigger switch 41 is manipulated, so that a defect that the first upper limit value E1 is not set is less likely to occur.

As described above, while the rotary shaft of the motor 31 rotates at the rotation speed corresponding to the first upper limit value E1, the current sensor 51 measures the current input to the motor 31. Moreover, the motor 31 operates to drive the tool 10 to rotate, thereby screwing the screw N2 into the member 100 to a state as represented by a screw N3. Since the screw N2 is gradually screwed into the member 100, friction between the screw N2 and the member 100 gradually increases, and therefore, the value of the current measured by the current sensor 51 gradually increases (see FIG. 4A). The value of the current measured by the current sensor 51 is then input to the controller 60, and the controller 60 makes determination by comparing the value of the current measured with a prescribed value (first determination value I1). That is, the controller 60 determines the degree of the load applied to the motor 31 based on the value of the current input to the motor 31. In the present embodiment, the first determination value I1 is 4 A.

When the value of an input current which is the current input to the motor 31 and which is measured by the current sensor 51 is smaller than the first determination value I1, the first upper limit value E1 is maintained, and the tool 10 continues rotating at the rotation speed corresponding to the first upper limit value E1, and the current sensor 51 continues measuring the input current. In contrast, when the value of the input current input to the motor 31 and measured by the current sensor 51 is larger than or equal to the prescribed first determination value I1, it is determined that the state as represented by the screw N3 is achieved, and the controller 60 sets a second upper limit value E2 in the motor driver 52. The second upper limit value E2 is a value larger than the first upper limit value E1. That is, the controller 60 determines that the load applied to the motor 31 increases, and based on the load, the controller 60 increases the rotation speed of the rotary shaft of the motor 31. Note that in the present embodiment, the second upper limit value E2 is 1000 rpm.

Then, the rotary shaft of the motor 31 starts rotating at a rotation speed corresponding to the second upper limit value E2. While the rotary shaft of the motor 31 rotates at the rotation speed corresponding to the second upper limit value E2, the current sensor 51 measures the current input to the motor 31. Moreover, the motor 31 operates to drive the tool 10 to rotate, thereby screwing the screw N3 into the member 100 to a state as represented by a screw N4. Since the screw N3 is gradually screwed into the member 100, friction between the screw N3 and the member 100 gradually increases, and therefore, the value of the current measured by the current sensor 51 gradually increases (see FIG. 4A). The value of the current measured by the current sensor 51 is then input to the controller 60, and the controller 60 makes determination by comparing the value of the current measured with a prescribed value (second determination value I2). In the present embodiment, the second determination value I2 is 8 A.

When the value of the input current input to the motor 31 and measured by the current sensor 51 is smaller than the second determination value I2, the second upper limit value E2 is maintained, and the tool 10 continues rotating at the rotation speed corresponding to the second upper limit value E2, and the current sensor 51 continues measuring the input current. In contrast, when the value of the input current input to the motor 31 and measured by the current sensor 51 is larger than or equal to the prescribed second determination value I2, it is determined that the state as represented by the screw N4 is achieved, and the controller 60 sets a third upper limit value E3 in the motor driver 52. The third upper limit value E3 is a value larger than the second upper limit value E2. That is, the controller 60 determines that the load applied to the motor 31 increases, and based on the load, the controller 60 increases the rotation speed of the rotary shaft of the motor 31. Note that in the present embodiment, the third upper limit value E3 is 1500 rpm.

Then, the rotary shaft of the motor 31 starts rotating at a rotation speed corresponding to the third upper limit value E3. While the rotary shaft of the motor 31 rotates at the rotation speed corresponding to the third upper limit value E3, the current sensor 51 measures the current input to the motor 31. Moreover, the motor 31 operates to drive the tool 10 to rotate, thereby screwing the screw N4 into the member 100 to a state as represented by a screw N5. Since the screw N4 is gradually screwed into the member 100, friction between the screw N4 and the member 100 gradually increases, and therefore, the value of the current measured by the current sensor 51 gradually increases (see FIG. 4A). The value of the current measured by the current sensor 51 is then input to the controller 60, and the controller 60 makes determination by comparing the value of the current measured with a prescribed value (third determination value I3). In the present embodiment, the third determination value I3 is 14 A.

When the value of the input current input to the motor 31 and measured by the current sensor 51 is smaller than the third determination value I3, the third upper limit value E3 is maintained, and the tool 10 continues rotating at the rotation speed corresponding to the third upper limit value E3, and the current sensor 51 continues measuring the input current. In contrast, when the value of the input current input to the motor 31 and measured by the current sensor 51 is larger than or equal to the prescribed third determination value I3, it is determined that the state as represented by the screw N5 is achieved, and the controller 60 sets a fourth upper limit value E4 in the motor driver 52. The fourth upper limit value E4 is a value larger than the third upper limit value E3. That is, the controller 60 determines that the load applied to the motor 31 increases, and based on the load, the controller 60 increases the rotation speed of the rotary shaft of the motor 31. Note that in the present embodiment, the fourth upper limit value E4 is 3000 rpm.

Then, the rotary shaft of the motor 31 starts rotating at a rotation speed corresponding to the fourth upper limit value E4. Moreover, the motor 31 operates to drive the tool 10 to rotate, thereby screwing the screw N5 into the member 100 to a state as represented by a screw N6. When a user determines that a state represented by the screw N6 is achieved, the press of the trigger switch 41 is released. Thus, the controller 60 controls such that the motor driver 52 stops the input current to the motor 31 (see FIG. 4A). When the input current to the motor 31 is stopped, the rotation speed of the rotary shaft decreases, and the rotary shaft eventually stops rotating, so that driving of the tool 10 (see FIG. 4B) to rotate is stopped. Thus, tightening of the screw N6 ends.

In the electric power tool 1 of the present embodiment, after the trigger switch 41 is pressed by being manipulated, the trigger switch 41 is kept pressed with a maximum pressing amount until the tightening ends (see FIG. 4C). However, in the present embodiment, the current input to the motor 31 is measured as the load (see FIG. 4A), and based on the load, the controller 60 performs control such that the rotation speed of the motor 31 stepwise increases. This enables the occurrence of an abrupt increase of the rotation speed of the motor 31 to be reduced, and it is possible to reduce the occurrence of reaction unexpected by a user. In particular, at a first stage of tightening (state represented by the screw N1 shown in FIG. 4D), the screw N1 is instable, and therefore, if the trigger switch 41 is pressed by the maximum amount at once to rotate the tool 10, the screw N1 tends to fall, and the tightening is difficult. However, in the present embodiment, at the first stage of tightening, the tool 10 is rotated at a low speed, and therefore, the screw N1 does not easily fall, and the tightening is thus easy.

As in a conventional case, when the motor 31 is not controlled by the controller 60 based on the input current to the motor 31, pressing the trigger switch 41 by the maximum amount at once leads to an abrupt increase of the input current to the motor 31 after generation of an inrush current (see broken line in FIG. 4A). In this case, the rotation speed of the motor 31 also abruptly increases (see broken line in FIG. 4B). Thus, at the first stage of tightening (state represented by the screw N1 in FIG. 4D), the screw N1 is instable, and therefore, in the conventional case, the tightening is difficult. Moreover, manipulation of gradually pressing the trigger switch 41 is performed so that the input current to the motor 31 does not abruptly increase, but in this case, subtle manipulation by finger tips is required, which requires time and labor. In the present embodiment, screws are easily tightened while the time and labor is reduced.

(3) Variation

The embodiment is a mere example of various embodiments of the present disclosure. Various modifications may be made to the embodiment depending on design and the like as long as the object of the present disclosure is achieved.

In the present embodiment, a switching section 61 may be provided. The switching section 61 has a function of switching between a mode in which the controller 60 performs, based on the upper limit value, control of rotation of the driver 30 and a mode in which the controller 60 forgoes the control. That is, the switching section 61 is a changeover switch and when the switching section 61 is turned ON, the controller 60 controls the motor 31 and when the switching section 61 is turned OFF, the controller 60 does not control the motor 31. When the changeover switch is OFF, the controller 60 changes the input current in accordance with the pressing amount of the trigger switch 41. Thus, in the present embodiment, it is possible to perform switching between usage in which the controller 60 controls the motor 31 as described above and usage in which the controller 60 does not control the motor 31 as in the conventional case. Thus, it is possible to adopt the present embodiment accordingly based on the preference of a user. The switching section 61 may be exposed from the outer surface of the body 20 and is preferably configured to be switched by a user depending on work and the like.

The present embodiment is applicable not only to screwing of screws but also to tightening of screws, tightening of bolts or nuts, and the like. In this case, the tool 10 is replaced with a tool suitable for the shape of the bolt or nut.

SUMMARY

As described above, an electric power tool (1) of a first aspect includes a body (20), a driver (30), a manipulation section (40), a load sensor (50), and a controller (60). To the body (20), a tool (10) is attachable. The driver (30) is configured to drive the tool (10) to rotate, the tool (10) being attached to the body (20). The manipulation section (40) is configured to receive an operation for causing rotation of the driver (30). The load sensor (50) is configured to measure a load caused when the driver (30) operates. The controller (60) is configured to: set an upper limit value of a rotation speed of the driver (30) in accordance with the load measured by the load sensor (50); and control rotation of the driver (30) based on the upper limit value.

With this aspect, the controller (60) sets the upper limit value of the rotation speed of the driver (30) in accordance with the load. Therefore, this aspect provides the advantage that the occurrence of an excessively high rotation speed of the driver (30) is reduced and screws and the like are easily tightened.

In an electric power tool (1) of a second aspect referring to the first aspect, the load sensor (50) starts measuring the load after an elapse of a prescribed time since manipulation of the manipulation section (40).

This aspect enables the load sensor (50) to perform the measuring with reduced influence of an inrush current generated immediately after manipulation of the manipulation section (40). Thus, this provides the advantage of reducing defects that the upper limit value of the rotation speed of the driver (30) is not set.

In an electric power tool (1) of a third aspect referring to the first or second aspect, the controller (60) is configured to set a first upper limit value as the upper limit value in accordance with a first load measured by the load sensor (50). Moreover, the controller (60) is configured to set a second upper limit value in accordance with a second load. The second load is a load measured by the load sensor (50) after setting of the first upper limit value. The second load is larger than the first load. The second upper limit value is larger than the first upper limit value.

This aspect provides the advantage that the upper limit value can be set stepwise in accordance with the load applied to the driver (30), and the occurrence of an abrupt change of operation of the driver (30) can be reduced to drive the tool (10) to rotate stably.

In an electric power tool (1) of a fourth aspect referring to any one of the first to third aspects, the driver (30) includes a motor (31), and the load sensor (50) is configured to measure, as the load, a current flowing through the motor (31).

This aspect enables the load applied to the motor (31) to be measured as a current, and the current, which changes substantially proportionally to the load, enables the load applied to the motor (31) to be easily measured.

An electric power tool (1) of a fifth aspect referring to any one of the first to fourth aspects further including a switching section (61) configured to switch between a mode in which the controller (60) performs control of operation of the driver (30) based on the upper limit value and a mode in which the controller (60) forgoes the control.

This aspect enables the switching section (61) to switch between controlling and not controlling of the operation of the driver (30) by the controller (60) and thus provides the advantage that usage can be easily changed.

In an electric power tool (1) of a sixth aspect referring to any one of the first to fifth aspects, the tool (10) is a driver bit configured to tighten or screw a screw.

This aspect provides the advantage that screws are easily tightened or screwed with the tool (10).

While various embodiments have been described herein above, it is to be appreciated that various changes in form and detail may be made without departing from the spirit and scope of the present disclosure presently or hereafter claimed.

The invention claimed is:

1. An electric power tool, comprising:

a body to which a tool is attached;

a driver configured to drive the tool to rotate;

a manipulation section configured to receive an operation for causing rotation of the driver;

a load sensor configured to measure a load caused when the driver operates; and a controller configured to:

set an upper limit value of a rotation speed of the driver in accordance with the load measured by the load sensor, and control the rotation of the driver based on the upper limit value, wherein:

the load sensor is configured to start measuring the load after an elapse of a prescribed time at which flow of an inrush current ends, the driver includes a motor, the load sensor is configured to measure, as the load, a current flowing through the motor, the tool is a driver bit configured to tighten or screw a screw, the manipulation section includes a trigger switch, the controller is configured to, after start of tightening or screwing the screw and before the rotation speed reaches a maximum to fully seat the screw, increase the upper limit value of the rotation speed twice or more in a stepwise manner based on the load measured by the load sensor such that a rotation speed of the motor increases twice or more in a stepwise manner when the trigger switch is pressed with a maximum pressing amount and is kept pressed with the maximum pressing amount, the controller is configured to set a first upper limit value as the upper limit value in accordance with a first load measured by the load sensor, and the controller is configured to set a second upper limit value in accordance with a second load, the second load being a load measured by the load sensor after setting of the first upper limit value, the second load being larger than the first load, the second upper limit value being larger than the first upper limit value.

2. The electric power tool of claim 1, further comprising a switching section configured to switch between a mode in which the controller performs control of the rotation of the driver based on the upper limit value and a mode in which the controller forgoes the control.

* * * * *